United States Patent
Yabe et al.

(10) Patent No.: US 9,467,011 B2
(45) Date of Patent: Oct. 11, 2016

(54) MOLD STATOR, ELECTRIC MOTOR, AND AIR-CONDITIONER OUTDOOR UNIT

(71) Applicant: Mitsubishi Electric Corporation, Tokyo (JP)

(72) Inventors: Koji Yabe, Tokyo (JP); Naohiro Oketani, Tokyo (JP); Hiroshi Yamanaka, Tokyo (JP); Hironori Yabuuchi, Tokyo (JP); Takayuki Onihashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 317 days.

(21) Appl. No.: 14/343,102

(22) PCT Filed: Oct. 19, 2012

(86) PCT No.: PCT/JP2012/077141
§ 371 (c)(1),
(2) Date: Mar. 6, 2014

(87) PCT Pub. No.: WO2014/061159
PCT Pub. Date: Apr. 24, 2014

(65) Prior Publication Data
US 2015/0084444 A1 Mar. 26, 2015

(51) Int. Cl.
*H02K 1/04* (2006.01)
*H02K 1/16* (2006.01)
(Continued)

(52) U.S. Cl.
CPC ............. *H02K 1/165* (2013.01); *H02K 1/148* (2013.01); *H02K 5/08* (2013.01)

(58) Field of Classification Search
CPC .......... H02K 1/148; H02K 5/08; H02K 5/02; H02K 15/02; H02K 15/14

USPC ............ 310/43, 216.043, 216.055, 216.065, 310/216.067, 216.069, 216.088, 216.093, 310/216.094, 216.023
See application file for complete search history.

(56) References Cited

U.S. PATENT DOCUMENTS 6,166,474 A * 12/2000 Kohara ............... H02K 1/148
29/596
2002/0195885 A1* 12/2002 Tsuneyoshi ........... H02K 1/185
310/43
(Continued)

FOREIGN PATENT DOCUMENTS

JP 07-039319 Y2 9/1995
JP 09-037501 A 2/1997
(Continued)

OTHER PUBLICATIONS

Office Action issued Oct. 6, 2015 in the corresponding JP application No. 2013-544914.
(Continued)

*Primary Examiner* — Thanh Lam
(74) *Attorney, Agent, or Firm* — Posz Law Group, PLC

(57) ABSTRACT

A mold stator is configured to include a stator core and a mold resin that covers the stator core. A divided-core part includes a yoke part that is arranged coaxially with a rotor that is provided in the stator core, a teeth part that extends from the yoke part in a radially-inward direction, and a teeth distal-end part that is formed at a radially-inward end part of the teeth part. An outer-circumferential flat-surface part is formed on an outer circumferential surface of the yoke part and an outer-circumferential flat-surface part is formed at a position on an outer circumferential surface of the mold stator opposing the flat-surface part of the yoke part.

11 Claims, 9 Drawing Sheets

(51) Int. Cl.
*H02K 1/14* (2006.01)
*H02K 5/08* (2006.01)

(56) References Cited

U.S. PATENT DOCUMENTS

| | | | |
|---|---|---|---|
| 2003/0062795 A1 | 4/2003 | Otsuki et al. | |
| 2003/0222531 A1* | 12/2003 | Akutsu | G01D 5/2046 310/216.074 |
| 2006/0022549 A1* | 2/2006 | Otsuji | H02K 3/522 310/216.001 |
| 2006/0028087 A1* | 2/2006 | Ionel | H02K 1/148 310/216.086 |
| 2007/0114875 A1* | 5/2007 | Lyle | H02K 3/522 310/216.004 |
| 2009/0284096 A1* | 11/2009 | Katagiri | H02K 1/148 310/216.001 |

FOREIGN PATENT DOCUMENTS

| | | |
|---|---|---|
| JP | 10-014145 A | 1/1998 |
| JP | 10-174335 A | 6/1998 |
| JP | 11-032454 A | 2/1999 |
| JP | 2000-069693 A | 3/2000 |
| JP | 2000-078789 A | 3/2000 |
| JP | 2002-199666 A | 7/2002 |
| JP | 2002-233091 A | 8/2002 |
| JP | 2003-032923 A | 1/2003 |
| JP | 2003-158833 A | 5/2003 |
| JP | 2003-235187 A | 8/2003 |
| JP | 2004-236500 A | 8/2004 |
| JP | 2006-288096 A | 10/2006 |
| JP | 2007-189783 A | 7/2007 |
| JP | 2007-329990 A | 12/2007 |
| JP | 2008-236921 A | 10/2008 |
| JP | 2012-057583 A | 3/2012 |
| JP | 2012-085534 A | 4/2012 |

OTHER PUBLICATIONS

Office Action issued Oct. 10, 2015 in the corresponding CN application No. 201280043681.9.
International Search Report of the International Searching Authority mailed Jan. 22, 2013 for the corresponding international application No. PCT/JP2012/077141.
Office Action mailed May 12, 2015 in the corresponding JP application No. 2013-544914. (English translation attached).
Office Action mailed Sep. 2, 2014 issued in corresponding JP patent application No. 2013-544914. (and partial English translation).
Extended European Search Report dated Oct. 29, 2015 issued in corresponding EP patent application No. 12883436.3.

* cited by examiner

MOLD STATOR, ELECTRIC MOTOR, AND AIR-CONDITIONER OUTDOOR UNIT

CROSS REFERENCE TO RELATED APPLICATION

This application is a U.S. national stage application of International Patent Application No. PCT/JP2012/077141 filed on Oct. 19, 2012, the disclosure of which is incorporated herein by reference.

TECHNICAL FIELD

The present invention relates to a mold stator, an electric motor, and an air-conditioner outdoor unit.

BACKGROUND

Conventionally, mold stators are obtained by injecting a thermosetting resin (hereinafter, "mold resin") such as a BMC (Bulk Molding Compound) into a mold die that accommodates therein a stator core. For example, in a conventional mold stator described in Patent Literature 1 mentioned below, the horizontal cross-sectional shape of a stator core (the shape of a stator core as viewed planarly) is annular regular hexagonal and outside of the stator core is covered by a mold resin. That is, a plurality of vertexes that are formed so as to radially and outwardly protrude and a plurality of flat surface parts are formed on an outer circumference of the stator core. According to the conventional mold stator described in Patent Literature 1 mentioned below, in order to improve the yield of the stator, the flat surface part is provided on the outer circumference of the stator core.

Patent Literature

Patent Literature 1: Japanese Patent Application Laid-open No. 10-14145 (FIG. 4, paragraph [0016] and the like)

However, in the mold stator described in Patent Literature 1 mentioned above, while an outer circumferential surface of the mold stator is formed in an arc shape, an outer circumferential surface of a stator core is formed in a polygonal shape. Therefore, the thickness of a resin from a flat surface part of the stator core to the outer circumferential surface of the mold stator is larger than the thickness of a resin from a vertex of the stator core to the circumferential surface of the mold stator. As explained above, according to the conventional mold stator, there have been problems that, because a flat surface part is provided on an outer circumferential surface of the stator core, the thickness of a resin from the flat surface part of the stator core to an outer circumferential surface of the mold stator becomes thicker, so that it becomes difficult to further improve heat dissipation of the mold stator.

SUMMARY

The present invention has been achieved in view of the above problems, and an object of the present invention is to provide a mold stator, an electric motor, and an air-conditioner outdoor unit that can further improve heat dissipation.

In order to solve above-mentioned problems and to achieve the object, there is provided a mold stator that is configured to include a stator core that is formed by stacking a plurality of annular bodies having a plurality of divided-core pieces annularly arranged therein and a mold resin that covers the stator core, wherein a divided-core part that is formed by stacking the plurality of divided-core pieces includes a yoke part that is arranged coaxially with a rotor that is provided in the stator core, a teeth part that extends from the yoke part in a radially-inward direction, and a teeth distal-end part that is formed at a radially-inward end part of the teeth part, and wherein a first outer-circumferential flat-surface part is formed on an outer circumferential surface of the yoke part and a first outer-circumferential curved-surface part is formed on the outer circumferential surface of the yoke part other than the first outer-circumferential flat-surface part, a second outer-circumferential flat-surface part is formed at a position on an outer circumferential surface of the mold stator opposing the first outer-circumferential flat-surface part, and a second outer-circumferential curved-surface part is formed on the outer circumferential surface of the mold stator other than the second outer-circumferential flat-surface part, and the mold resin is formed such that when a thickness of the mold resin from the first outer-circumferential curved-surface part to the second outer-circumferential curved-surface part is denoted by "t1" and a thickness of the mold resin from the first outer-circumferential flat-surface part to the second outer-circumferential flat-surface part is denoted by "t2", a relationship of t1<t2 is satisfied.

According to the invention, the thickness of a mold resin between an outer-circumferential flat-surface part of a divided-core part and an outer-circumferential flat-surface part of a mold stator is reduced, so that heat dissipation can be further improved.

DETAILED DESCRIPTION

Exemplary embodiments of a mold stator, an electric motor, and an air-conditioner outdoor unit according to the present invention will be explained below in detail with reference to the accompanying drawings. The present invention is not limited to the embodiments.

First Embodiment

Figure 1:
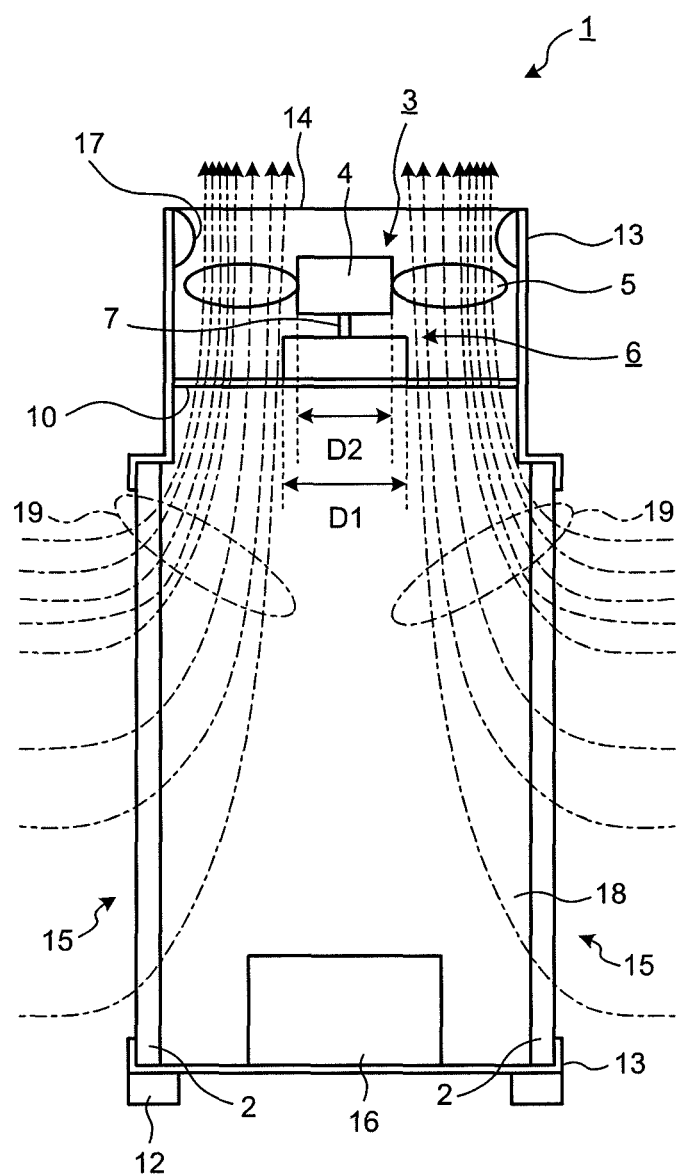
FIG. 1 is a side view of an outdoor unit constituting an air-conditioner according to first and second embodiments of the present invention.

FIG. 1 is a side view of an outdoor unit (hereinafter, "outdoor unit") 1 constituting an air-conditioner according to first and second embodiments of the present invention. FIG. 1 depicts the outdoor unit 1 of a top-flow system as an example of the outdoor unit 1 having an electric motor 6 according to the first and second embodiments applied thereto. The outdoor unit 1 includes a heat exchanger 2 that is provided on a side surface of a casing 13, an air inlet 15 that is provided in the side surface of the casing 13 so that air flows in the heat exchanger 2, an air outlet 14 that discharges the air that has flown in the heat exchanger 2 to a top surface of the outdoor unit, a fan 3 that takes air on a side surface of the outdoor unit therein and discharges the air from the air outlet 14 to outside of the outdoor unit, and the electric motor 6 that is interposed between the heat exchanger 2 and the fan 3 and rotates the fan 3.

The fan 3 is constituted by including blades 5 such as a propeller fan, a diagonal flow fan, and the like and a fan boss 4 that is formed in an annular shape, installed on a shaft 7, and holds the blades 5. The casing 13 is supported by a support leg 12 and the electric motor 6 is installed on an upper side of the inside of the casing 13 by a mounted bar 10 serving as a fixed member. An electric component 16 is provided inside the casing 13. For example, the electric component 16 is a compressor for boosting a coolant or a control substrate for controlling drive of a compressor and the electric motor 6. A bell mouth 17 is provided between the air outlet 14 and the fan 3. The bell mouth 17 reduces the pressure loss when an airflow 19 that flows in an air blowing chamber 18 is discharged outside the outdoor unit.

An operation of the outdoor unit 1 is explained. When a compressor needs to be operated because of the relationship between a setting temperature of an indoor unit (not shown) and an indoor temperature, a control substrate within the electric component 16 performs drive control on the compressor. When the compressor starts to be operated, a coolant circulates in the heat exchanger 2. Meanwhile, in the control substrate, drive control of the electric motor 6 is performed, a negative pressure is generated due to rotation of the fan 3 mounted on the electric motor 6, and air on a side surface of the outdoor unit is taken in the air blowing chamber 18. As the airflow 19 that is generated at this time flows in the heat exchanger 2, heat exchange between air around the heat exchanger 2 and the coolant is facilitated. As indicated by a dotted line in FIG. 1, the airflow 19 having been taken in the air blowing chamber 18 flows within the air blowing chamber 18, passes between the casing 13 and the electric motor 6, and is discharged from the air outlet 14.

In this case, as for the efficiency of the electric motor 6 (motor efficiency), when the ratio of a copper loss to an iron loss is high, by increasing an outer diameter D1 of the electric motor 6, the copper loss is reduced, thereby improving the efficiency. Therefore, the electric motor 6 is formed such that the outer diameter D1 thereof becomes large. For example, in the electric motor 6 of an inner-rotor type, the copper loss is reduced by increasing a winding area. Therefore, by increasing the outer diameter D1 (that is, by increasing the diameter of a stator core), the motor efficiency can be effectively improved.

However, in the outdoor unit 1 of a top-flow type, the electric motor 6 is provided between the heat exchanger 2 and the air outlet 14. Therefore, when the outer diameter D1 of the electric motor 6 is larger than necessary, an airflow path of the airflow 19 is blocked by a factor other than the fan boss 4 (that is, the electric motor 6) and the amount of the airflow 19 flowing in the heat exchanger 2 is reduced, so that heat exchange efficiency is reduced.

According to the electric motor 6 of the first embodiment, to improve the heat exchange efficiency of the outdoor unit 1 without reducing its motor efficiency, an outer-circumferential flat-surface part 32d is formed on an outer circumferential surface of a divided-core part 32 (described later), and an outer-circumferential flat-surface part 71b1 is formed on an outer circumferential surface of a mold stator 80 (described later). A configuration of the electric motor 6 is specifically explained below.

Figure 2:
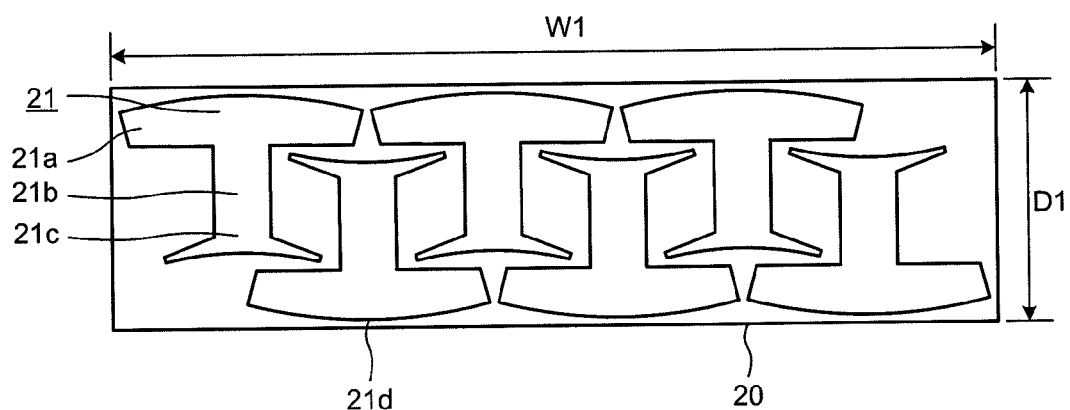
FIG. 2 depicts a divided-core piece having an arc-shaped curved part formed therein.

FIG. 2 depicts a divided-core piece 21 having an arc-shaped curved part 21d formed therein. The divided-core piece 21 is used for a stator core 40 (described later). For example, the divided-core piece 21 is obtained by punching a square magnetic steel sheet 20 having a horizontal width W1 that is longer than a depth D1 using a die for forming the contour of the divided-core piece 21. As shown in FIG. 2, a plurality of the divided-core pieces 21 are obtained from the magnetic steel sheet 20, and these divided-core pieces 21 are also used for the stator core 40 (described later), a rotor (not shown), and the like.

The divided-core piece 21 is formed in a substantially T-shape and is configured to include a yoke 21a, a teeth 21b, and a teeth distal-end 21c. The arc-shaped curved part 21d is formed on the opposite side of the yoke 21a with respect to the teeth 21b. The curved part 21d corresponds to an outer-circumferential curved-surface part 22d of the stator core 40 (described later).

Figure 3:
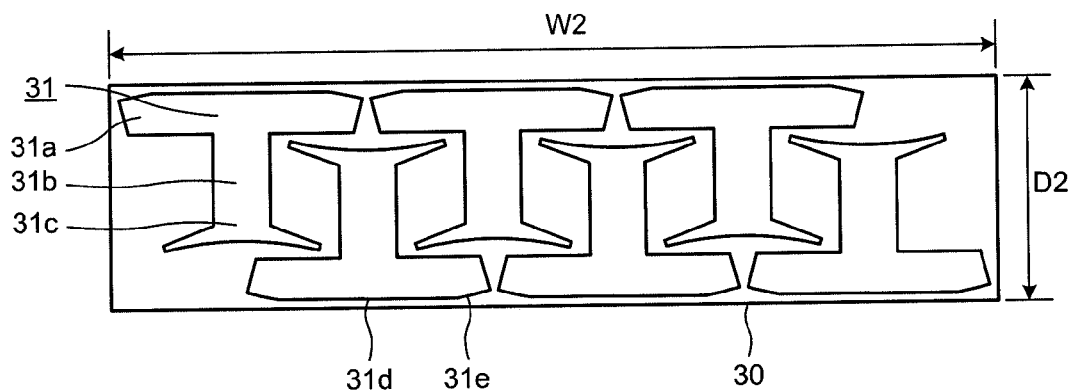
FIG. 3 depicts a divided-core piece having a straight-line part formed therein.

FIG. 3 depicts a divided-core piece 31 having a straight-line part 31d formed therein. The divided-core piece 31 is used for a stator core 60 (described later). For example, the divided-core piece 31 is obtained by punching a square magnetic steel sheet 30 having a horizontal width W2 that is longer than a depth D2 using a die for forming the contour of the divided-core piece 31.

The divided-core piece 31 is formed in a substantially T-shape and is configured to include a yoke 31a, a teeth 31b, and a teeth distal-end 31c. The straight-line part 31d is formed on the opposite side of the yoke 31a with respect to the teeth 31b. The straight-line part 31d corresponds to the outer-circumferential flat-surface part 32d of the stator core 60 (described later).

As shown in FIG. 3, a plurality of the divided-core pieces 31 are obtained from the magnetic steel sheet 30. Because the linear straight-line part 31d is formed on the opposite side of the yoke 31a with respect to the teeth 31b, the depth D2 of the magnetic steel sheet 30 is smaller than the depth D1 of the magnetic steel sheet 20, so that the material usage is also reduced.

Figure 4:
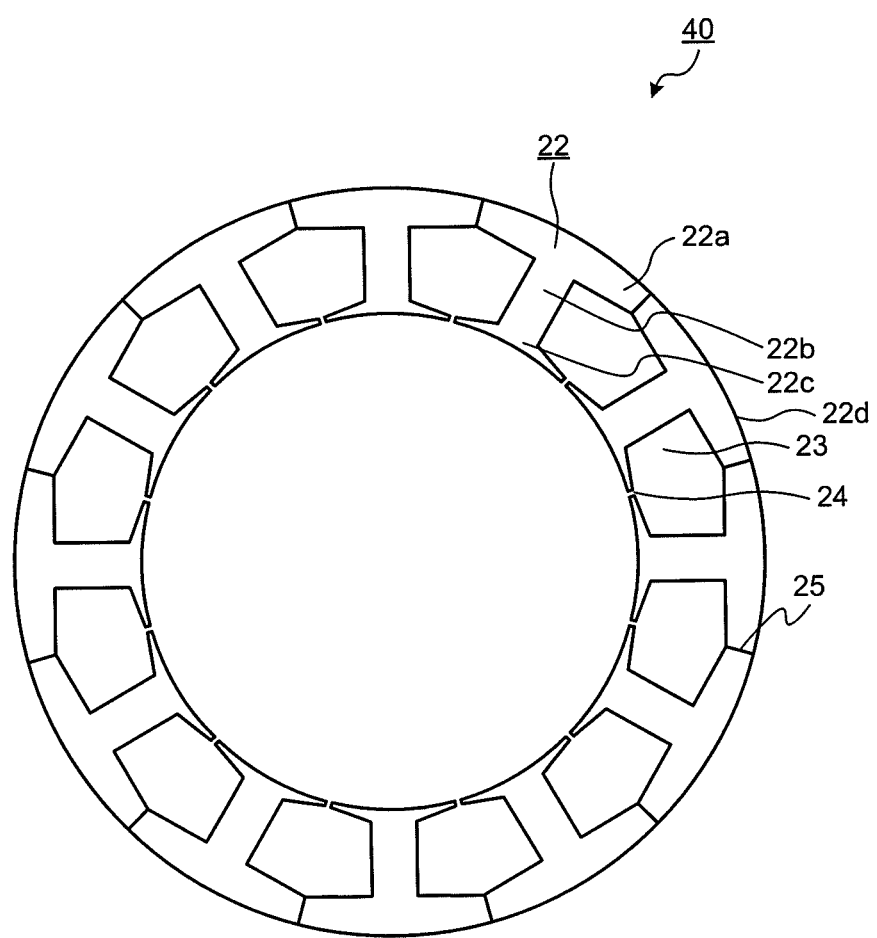
FIG. 4 is a cross-sectional view of a stator core formed by using the divided-core piece shown in FIG. 2.
Figure 5:
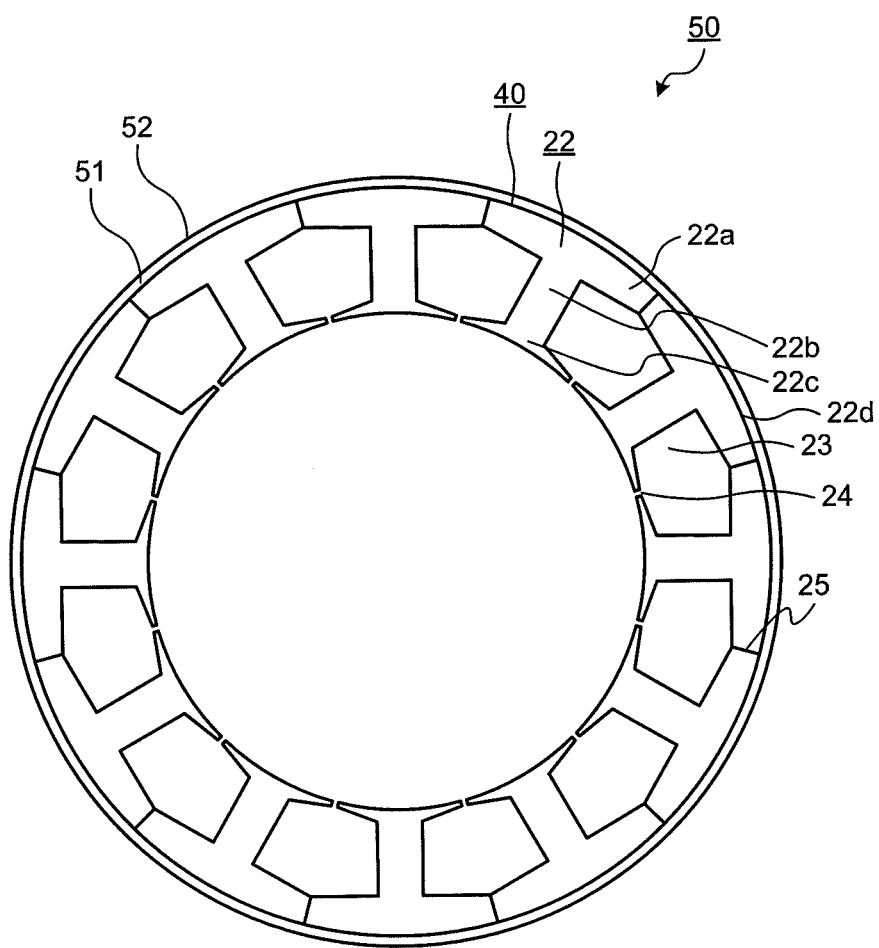
FIG. 5 is a cross-sectional view of a mold stator formed by molding the stator core shown in FIG. 4.

FIG. 4 is a cross-sectional view of the stator core 40 formed by using the divided-core piece 21 shown in FIG. 2. FIG. 5 is a cross-sectional view of a mold stator 50 formed by molding the stator core 40 shown in FIG. 4. The stator core 40 is constituted by stacking a plurality of annular bodies having the divided-core pieces 21 (see FIG. 2) annularly arranged therein in a thickness direction. That is, circumferential end parts 25 of adjacent divided-core parts 22 are connected to each other, so that the annular stator core 40 is formed. The divided-core part 22 is obtained by stacking a plurality of the divided-core pieces 21, and is configured to include a yoke part 22a formed of a plurality of the yokes 21a, a teeth part 22b formed of the teeth 21b, and a teeth distal-end part 22c formed of a plurality of the teeth distal-ends 21c.

A slot 23 is formed by a space that is defined by the yoke part 22a, the teeth part 22b, and the teeth distal-end part 22c.

A slot opening 24 for inserting a winding wire (not shown) into the slot 23 is formed at a portion where circumferential end parts of the adjacent teeth distal-end parts 22c oppose to each other.

FIG. 5 depicts the mold stator 50 that is molded by a mold resin 51. An outer circumferential surface 52 of the mold stator 50 is formed in an arc shape. Therefore, the thickness from the outer-circumferential curved-surface part 22d of the stator core 40 to the outer circumferential surface 52 of the mold stator 50 is substantially the same in any part in a circumferential direction.

Figure 6:
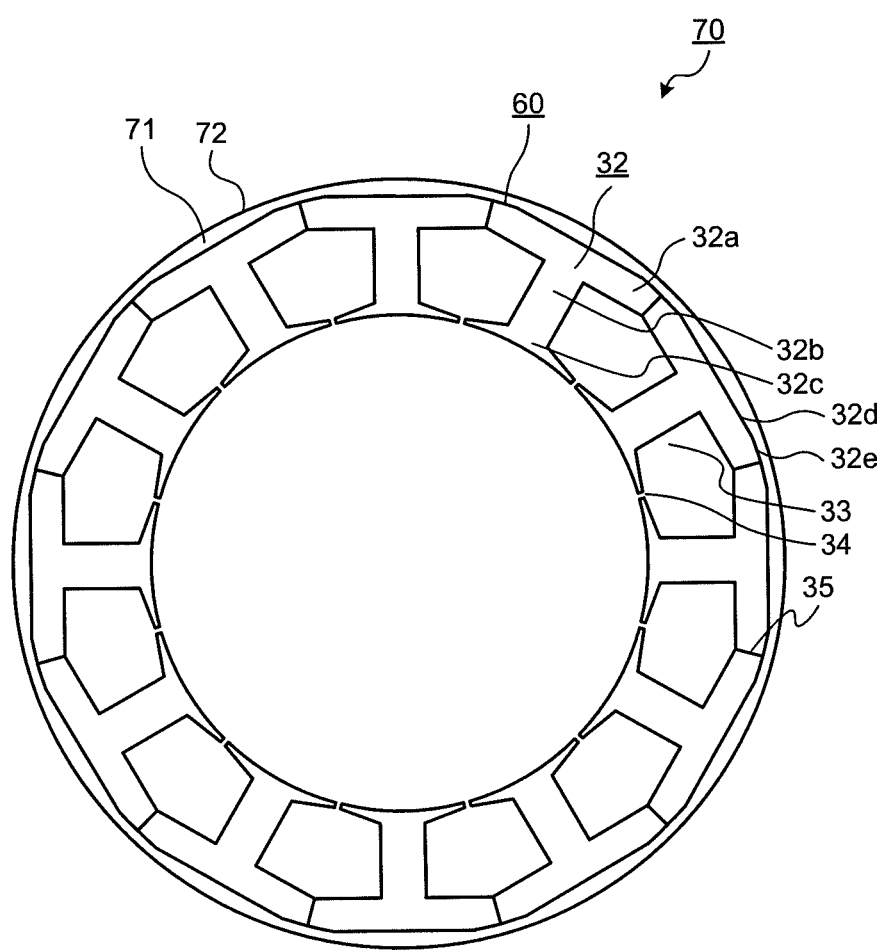
FIG. 6 is a cross-sectional view of a mold stator that is formed by using the divided-core piece shown in FIG. 3.
Figure 7:
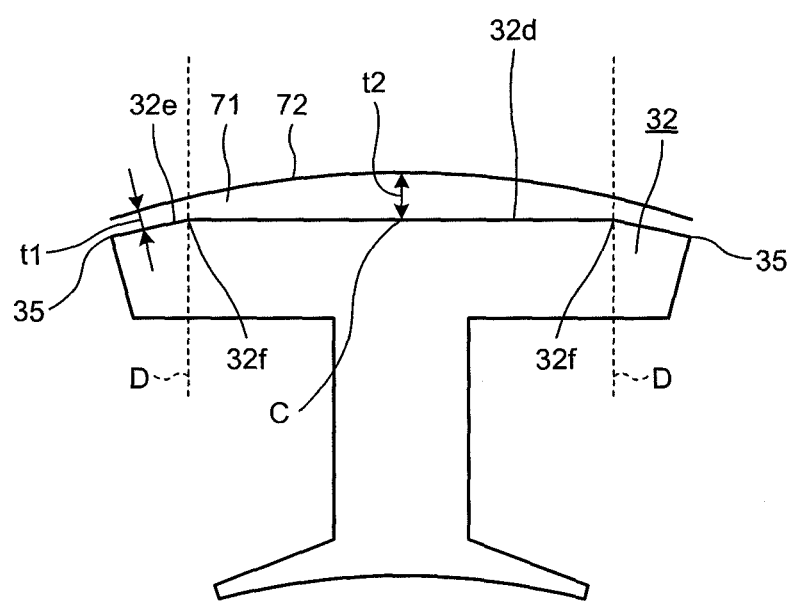
FIG. 7 is an enlarged view of relevant parts of the mold stator shown in FIG. 6.

FIG. 6 is a cross-sectional view of a mold stator 70 formed by using the divided-core piece 31 shown in FIG. 3. FIG. 7 is an enlarged view of relevant parts of the mold stator 70 shown in FIG. 6. The stator core 60 is constituted by stacking a plurality of annular bodies having the divided-core pieces 31 (see FIG. 3) annularly arranged therein in a thickness direction. That is, circumferential end parts 35 of the adjacent divided-core parts 32 are connected to each other, so that the annular stator core 60 is formed. The divided-core part 32 is formed by stacking a plurality of the divided-core pieces 31, and is configured to include a yoke part 32a formed of a plurality of the yokes 31a, a teeth part 32b formed of the teeth 31b, and a teeth distal-end part 32c formed of a plurality of the teeth distal-ends 31c.

A slot 33 is formed by a space that is defined by the yoke part 32a, the teeth part 32b, and the teeth distal-end part 32c. A slot opening 34 for inserting a winding wire (not shown) into the slot 33 is formed at a portion where circumferential end parts of the adjacent teeth distal-end parts 32c oppose to each other.

FIG. 6 depicts the mold stator 70 that is molded by a mold resin 71. An outer circumferential surface 72 of the mold stator 70 is formed in an arc shape similarly to the mold stator 50 shown in FIG. 5.

Meanwhile, in FIG. 7, for example, when a center position of the teeth part 32b in a circumferential direction is denoted by "C", a part of the divided-core part 32 from the center position C to a predetermined position D in a circumferential direction thereof is formed in a flat surface shape, and a part of the divided-core part 32 from the predetermined position D to the circumferential end part 35 is formed in an arc shape. An outer-circumferential vertex 32f is formed at the predetermined position D. The outer-circumferential vertex 32f is formed so as to radially and outwardly protrude between an outer-circumferential curved-surface part 32e and the outer-circumferential flat-surface part 32d. Because the stator core 60 is formed in an annular shape by combining the divided-core parts 32 with each other, a flat-surface part and a curved-surface part are formed on an outer circumferential surface of the stator core 60.

When the thickness from the outer-circumferential curved-surface part 32e of the divided-core part 32 to the outer circumferential surface 72 of the mold stator 70 is denoted by "t1", and the thickness from the outer-circumferential flat-surface part 32d of the divided-core part 32 to the outer circumferential surface 72 of the mold stator 70 is denoted by "t2", the thickness t2 is larger than the thickness t1.

When the mold stator 70 is used for the electric motor 6 shown in FIG. 1, the usage of the magnetic steel sheet 30 can be reduced. However, in the outdoor unit 1 of a top-flow type, when the outer diameter D1 of the electric motor 6 is larger than necessary, the airflow path of the airflow 19 is blocked by the electric motor 6. Therefore, it is desirable that the circumferential thickness of the mold resin 71 shown in FIG. 6 is as thin as possible. In the mold stator 70, because the thickness t2 is relatively larger than the thickness t1, the usage of the mold resin 71 that is provided on an outer circumferential side of the outer-circumferential flat-surface part 32d is increased. Accordingly, as compared to the mold stator 50 shown in FIG. 5, not only the mold material usage is increased, but also dissipation of heat that generates on the outer-circumferential flat-surface part 32d of the yoke part 32a is prevented.

Figure 8:
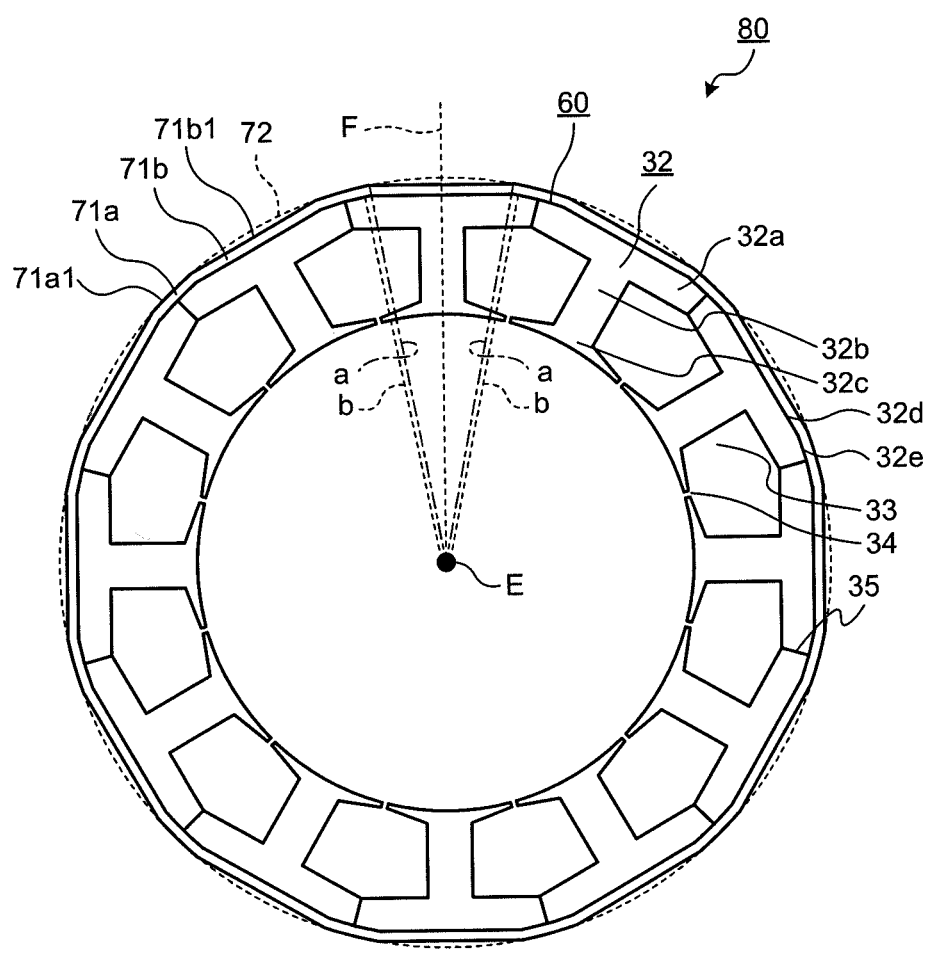
FIG. 8 is a cross-sectional view of a mold stator according to the first embodiment of the present invention.
Figure 9:
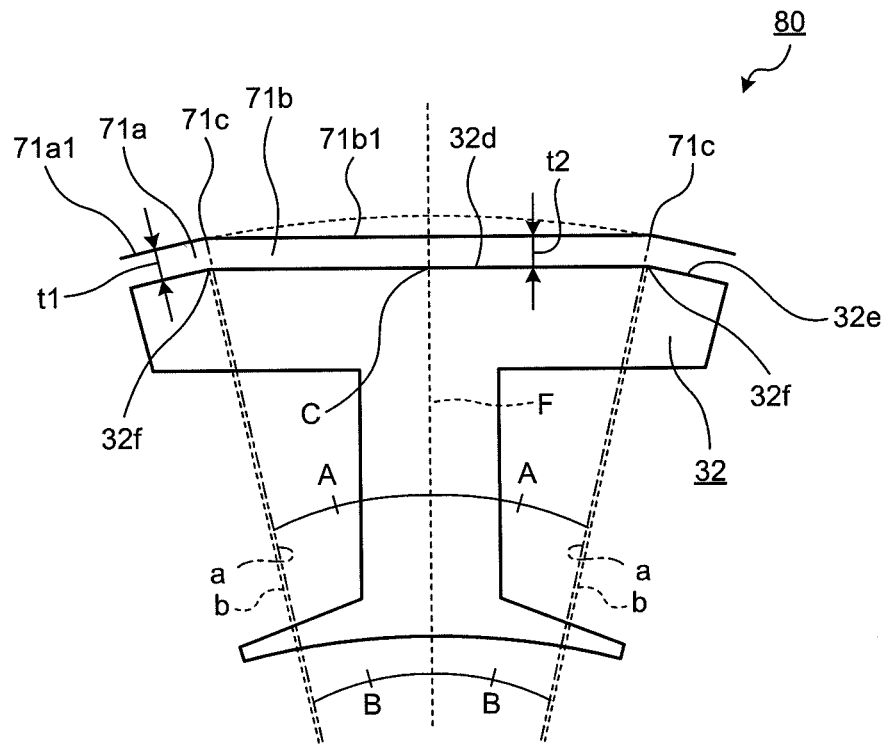
FIG. 9 is an enlarged view of relevant parts of the mold stator according to the first embodiment of the present invention.

FIG. 8 is a cross-sectional view of the mold stator 80 according to the first embodiment of the present invention. FIG. 9 is an enlarged view of relevant parts of the mold stator 80 according to the first embodiment of the present invention. The mold stator 80 is different from the mold stator 70 shown in FIG. 7 in that the outer-circumferential flat-surface part 71b1 is formed on an outer circumferential surface of the mold stator 80 shown in FIG. 9.

In the mold stator 80, the thickness of a mold resin 71a from the outer-circumferential curved-surface part 32e of the divided-core part 32 to an outer-circumferential curved-surface part 71a1 of the mold stator 80 is denoted by "t1". Furthermore, in the mold stator 80, the thickness of a mold resin 71b from the outer-circumferential flat-surface part 32d of the divided-core part 32 to the outer-circumferential flat-surface part 71b1 of the mold stator 80 is denoted by "t2". The thickness t2 of the mold resin 71b is thinner than the thickness t2 of the mold resin 71 shown in FIG. 7.

As explained above, in the mold stator 80, the outer-circumferential flat-surface part 71b1 is formed at a position opposing the outer-circumferential flat-surface part 32d of the divided-core part 32. Accordingly, when the mold stator 80 is applied to the electric motor 6 shown in FIG. 1, the radial thickness of the mold resin 71b in a radial direction is smaller than that of the mold resin 71 in the radial direction shown in FIG. 6. Therefore, the amount of the airflow 19 becomes larger as compared to a case of applying the mold stator 70 shown in FIG. 6 to the electric motor 6 shown in FIG. 1.

In the mold stator 80, because the thickness t2 of the mold resin 71b is smaller than the thickness t2 of the mold resin 71 shown in FIG. 6, as compared to the mold stator 70 shown in FIG. 6, the usage of a mold resin can be reduced and dissipation of heat that generates on the outer-circumferential flat-surface part 32d of the yoke part 32a can be improved.

To maintain the mechanical strength of the mold stator 80, it is desirable to configure the mold stator 80 so that the relationship between the thickness t2 of the mold resin 71b and the thickness t1 of the mold resin 71a is $t1 \leq t2$.

To establish the relationship of $t1 \leq t2$, it suffices that the mold stator 80 is configured as follows. For example, assume that the center position of the mold stator 80 is denoted by "E", a line connecting the center position E to the center position C is denoted by "F", a line connecting the center position E to an outer-circumferential vertex 71c is denoted by "a", a line connecting the center position E to the outer-circumferential vertex 32f is denoted by "b", an angle formed by the line F and the line a is denoted by "A", and an angle formed by the line F and the line b is denoted by "B". In this case, by processing the mold resins 71a and 71b so that the relationship between the angles A and B satisfies $AB$, the relationship of $t1 \leq t2$ is established.

As explained above, the mold stator 80 according to the first embodiment is configured to include the stator core 60 that is formed by stacking a plurality of annular bodies having the divided-core pieces 31 annularly arranged therein and the mold resins 71a and 71b that cover the stator core 60. The divided-core part 32 that is formed by stacking a plurality of the divided-core pieces 31 includes the yoke part 32a that is arranged coaxially with a rotor (not shown) provided in the stator core 60, the teeth part 32b that extends from the yoke part 32a in a radially-inward direction, and the teeth distal-end part 32c that is formed at a radially-inward end part of the teeth part 32b. A first outer-circumferential flat-surface part (32d) is formed on an outer circumferential surface of the yoke part 32a, and a second outer-circumferential flat-surface part (71b1) is formed at a position on an outer circumferential surface of the mold stator 80 opposing the outer-circumferential flat-surface part 32d. With this configuration, the thickness of the mold resin 71 in a radial direction can be reduced. Therefore, the usage of a mold resin can be reduced and dissipation of heat that generates on the outer-circumferential flat-surface part 32d of the yoke part 32a can be improved. As a result, the manufacturing costs of the electric motor 6 can be reduced and reduction in efficiency due to heat generation of the electric motor 6 can be suppressed.

A first outer-circumferential curved-surface part (32e) is formed on the outer circumferential surface of the yoke part 32a according to the first embodiment other than the outer-circumferential flat-surface part 32d. A second outer-circumferential curved-surface part (71a1) is formed on the outer circumferential surface of the mold stator 80 other than the outer-circumferential flat-surface part 71b1. A mold resin is formed such that when the thickness of the mold resin 71a from the outer-circumferential curved-surface part 32e to the outer-circumferential curved-surface part 71a1 is denoted by "t1" and the thickness of the mold resin 71b from the outer-circumferential flat-surface part 32d to the outer-circumferential flat-surface part 71b1 is denoted by "t2", the relationship of t1≤t2 is satisfied. With this configuration, the mechanical strength of the mold stator 80 can be maintained while the thickness of the mold resin 71b is as thin as possible.

A first outer-circumferential vertex (32f) is formed between the first outer-circumferential curved-surface part (32e) and the first outer-circumferential flat-surface part (32d) on an outer circumferential surface of the stator core 60 according to the first embodiment. A second outer-circumferential vertex (71c) is formed between the second outer-circumferential curved-surface part (71a1) and the second outer-circumferential flat-surface part (71b1) on the outer circumferential surface of the mold stator 80. A mold resin is formed such that when a line connecting the center position E of the mold stator 80 to the center position C of the teeth part 32b in a circumferential direction is denoted by "F", a line connecting the center position E of the mold stator 80 to the outer-circumferential vertex 71c is denoted by "a", a line connecting the center position E of the mold stator 80 to the outer-circumferential vertex 32f is denoted by "b", an angle formed by the line F and the line a is denoted by "A", and an angle formed by the line F and the line b is denoted by "B", the relationship of A≤B is satisfied. With this configuration, the relationship of t1≤t2 is satisfied, and the mechanical strength of the mold stator 80 can be maintained while the thickness of the mold resin 71b is as thin as possible.

While effects of the present invention can be achieved regardless of the magnitude relationship of the outer diameter D1 and the outer diameter D2 of the fan boss 4, when the outer diameter D1 is equal to or larger than the outer diameter D2, because an electric motor is present in an airflow path, the influence of the electric motor 6 on the airflow path is large, so that greater effects can be achieved.

Second Embodiment

Figure 10:
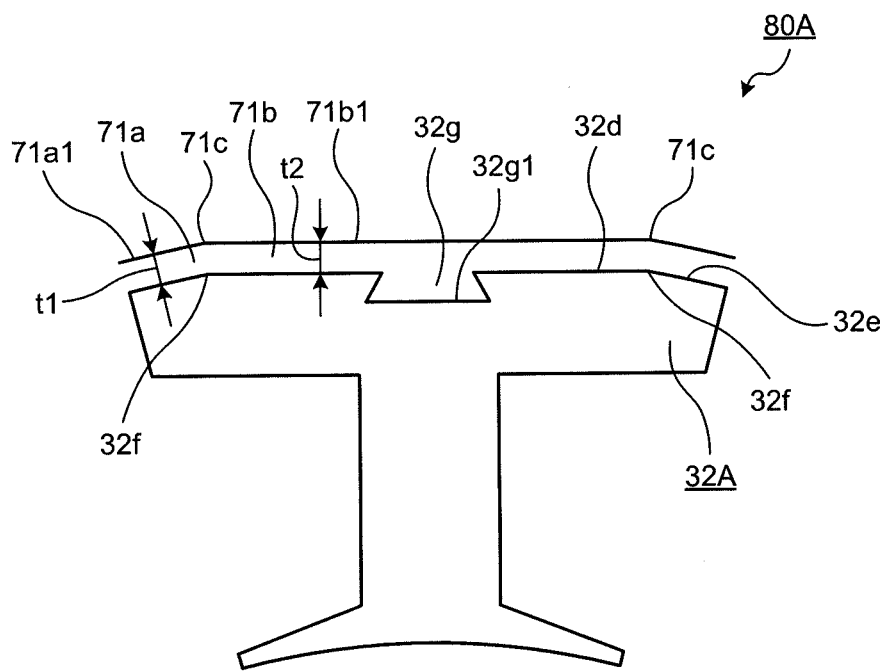
FIG. 10 is an explanatory diagram of a mold stator according to a second embodiment of the present invention.
Figure 11:
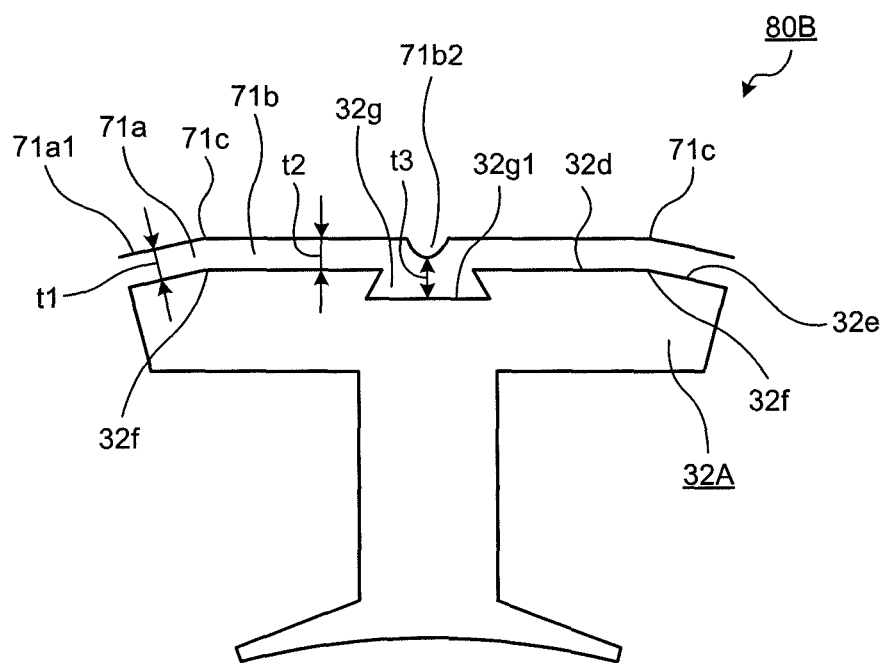
FIG. 11 is an enlarged view of relevant parts of the mold stator according to the second embodiment of the present invention.

FIG. 10 is an explanatory diagram of a mold stator according to a second embodiment of the present invention. FIG. 11 is an enlarged view of relevant parts of the mold stator according to the second embodiment of the present invention. The mold stator according to the second embodiment is different from the mold stator according to the first embodiment in that a divided-core part 32A is used instead of the divided-core part 32 and a dent 71b2 is formed on the outer-circumferential flat-surface part 71b1. In the second embodiment, elements like or similar to those of the first embodiment are denoted by like or similar reference signs and explanations thereof will be omitted, and only elements different from the first embodiment are described below.

A radially-inward protruding groove 32g is formed on the outer-circumferential flat-surface part 32d of the divided-core part 32A shown in FIG. 10. Even when the groove 32g is formed in the divided-core part 32A, the usage of a mold material can be reduced by forming the outer-circumferential flat-surface part 71b1 on an outer circumferential surface of a mold stator 80A. However, to effectively reduce the usage of the mold material, it is desirable to form the dent 71b2 in the mold resin 71b as shown in FIG. 11. That is, the dent 71b2 is formed at a position on the outer-circumferential flat-surface part 71b1 of a mold stator 80B according to the second embodiment opposing a bottom part 32g1 of the groove 32g.

When the thickness from the bottom part 32g1 of the groove 32g to the dent 71b2 is denoted by "t3", it is desirable that the thickness t3 is larger than the thickness t1 to maintain the mechanical strength of the mold stator 80B.

As explained above, in the mold stator 80B according to the second embodiment, the radially-inward protruding groove 32g is formed on the outer-circumferential flat-surface part 32d, and the radially-inward protruding dent 71b2 is formed at a position on the outer-circumferential flat-surface part 71b1 opposing the groove 32g. With this configuration, a factor that blocks the airflow path of the airflow 19 becomes small. As compared to the first embodiment, the heat exchange efficiency of the outdoor unit 1 of a top-flow type can be improved.

The outer-circumferential flat-surface part 32d is formed on an outer circumferential surface of the stator core 60 according to the first and second embodiments. For this reason, when a mold die is not positioned with respect to the stator core 60, erroneous positioning of the stator core 60 occurs. Mold forming is then performed in a state where the outer-circumferential curved-surface part 32e of the divided-core parts 32 and 32A is positioned near the outer-circumferential flat-surface part 71b1 of the mold resin 71b (that is, a flat-surface part formed in a die). As a result, the relationship between the thickness t2 of the mold resin 71b and the thickness t1 of the mold resin 71a may possibly be t1>t2.

To prevent such a possibility, a protrusion that is fitted into the slot opening 34 is formed in a mold die for manufacturing the mold stators 80 and 80A according to the first and second embodiments. This protrusion is fitted into the slot opening 34, thereby preventing erroneous positioning of the stator core 60.

Furthermore, when the electric motor 6 having a rotor incorporated in the mold stators 80 and 80A according to the first and second embodiments is used for the electric motor 6 of a top-flow system, a factor that blocks an airflow path becomes small and the heat exchange efficiency of the outdoor unit 1 can be improved without reducing the motor efficiency. While the first and second embodiments have explained the example of applying the mold stator 80 or 80A to the electric motor 6 of the outdoor unit 1 of a top-flow system, the outdoor unit 1 to which the mold stators 80 and 80A are applied is not limited to that of a top-flow system.

The mold stator, the electric motor, and the air-conditioner outdoor unit according to the embodiments of present invention represent only an example of the contents of the present invention, and the invention can be combined with other well-known techniques, and it is needless to mention that the present invention can be configured while modifying it without departing from the scope of the invention, such as omitting a part of its configuration.

INDUSTRIAL APPLICABILITY

As described above, the present invention is mainly applicable to a mold stator, and is particularly suitable as an invention that can further improve heat dissipation of a mold stator.

The invention claimed is:

1. A mold stator that is configured to include a stator core that is formed by stacking a plurality of annular bodies having a plurality of divided-core pieces annularly arranged therein and a mold resin that covers the stator core, wherein
   a divided-core part that is formed by stacking the plurality of divided-core pieces includes
   a yoke part that is arranged coaxially with a rotor that is provided in the stator core,
   a teeth part that extends from the yoke part in a radially-inward direction, and
   a teeth distal-end part that is formed at a radially-inward end part of the teeth part, and wherein
   a first outer-circumferential flat-surface part is formed on an outer circumferential surface of the yoke part and a first outer-circumferential curved-surface part is formed on the outer circumferential surface of the yoke part other than the first outer-circumferential flat-surface part,
   a second outer-circumferential flat-surface part is formed at a position on an outer circumferential surface of the mold stator opposing the first outer-circumferential flat-surface part, and a second outer-circumferential curved-surface part is formed on the outer circumferential surface of the mold stator other than the second outer-circumferential flat-surface part, and
   the mold resin is formed such that when a thickness of the mold resin from the first outer-circumferential curved-surface part to the second outer-circumferential curved-surface part is denoted by "t1" and a thickness of the mold resin from the first outer-circumferential flat-surface part to the second outer-circumferential flat-surface part is denoted by "t2", a relationship of t1<t2 is satisfied.

2. The mold stator according to claim 1, wherein
   a first outer-circumferential vertex is formed between the first outer-circumferential curved-surface part and the first outer-circumferential flat-surface part on an outer circumferential surface of the stator core,
   a second outer-circumferential vertex is formed between the second outer-circumferential curved-surface part and the second outer-circumferential flat-surface part on an outer circumferential surface of the mold stator, and
   the mold resin is formed such that when a line connecting a center position of the mold stator to a center position of the teeth part in a circumferential direction is denoted by "F", a line connecting the center position of the mold stator to the second outer-circumferential vertex is denoted by "a", a line connecting the center position of the mold stator to the first outer-circumferential vertex is denoted by "b", an angle formed by the line F and the line a is denoted by "A", and an angle formed by the line F and the line b is denoted by "B", a relationship of A≤B is satisfied.

3. The mold stator according to claim 1, wherein
   a radially-inward protruding groove is formed on the first outer-circumferential flat-surface part, and
   a radially-inward protruding dent is formed at a position on the second outer-circumferential flat-surface part opposing the groove.

4. The mold stator according to claim 1, wherein
   a radially-inward protruding groove is formed on the first outer-circumferential flat-surface part, and
   a radially-inward protruding curved dent is formed at a position on the second outer-circumferential flat-surface part opposing the groove.

5. The mold stator according to claim 1, wherein
   a slot opening is formed at a position where circumferential end parts of the teeth distal-end parts that are adjacent to each other oppose to each other, and
   a protrusion that is fitted into the slot opening is formed in a mold die for manufacturing the mold stator.

6. An electric motor comprising:
   the mold stator according to claim 1; and
   a rotor incorporated in the mold stator.

7. An air-conditioner outdoor unit that uses an electric motor including the mold stator according to claim 1 and a rotor incorporated in the mold stator as a fan motor.

8. A mold stator that is configured to include a stator core that is formed by stacking a plurality of annular bodies having a plurality of divided-core pieces annularly arranged therein and a mold resin that covers the stator core, wherein
   a divided-core part that is formed by stacking the plurality of divided-core pieces includes
   a yoke part that is arranged coaxially with a rotor that is provided in the stator core,
   a teeth part that extends from the yoke part in a radially-inward direction, and
   a teeth distal-end part that is formed at a radially-inward end part of the teeth part, and wherein
   a first outer-circumferential flat-surface part is formed on an outer circumferential surface of the yoke part,
   a second outer-circumferential flat-surface part is formed at a position on an outer circumferential surface of the mold stator opposing the first outer-circumferential flat-surface part,
   a radially-inward protruding groove is formed on the first outer-circumferential flat-surface part, and
   a radially-inward protruding curved dent is formed at a position on the second outer-circumferential flat-surface part opposing the groove.

9. The mold stator according to claim 8, wherein
   a slot opening is formed at a position where circumferential end parts of the teeth distal-end parts that are adjacent to each other oppose to each other, and
   a protrusion that is fitted into the slot opening is formed in a mold die for manufacturing the mold stator.

10. An electric motor comprising:
    the mold stator according to claim 8; and
    a rotor incorporated in the mold stator.

11. An air-conditioner outdoor unit that uses an electric motor including the mold stator according to claim 8 and a rotor incorporated in the mold stator as a fan motor.

* * * * *